May 16, 1967  J. A. TOMCHAK  3,319,687
ACCESSORY FOR TIRE-TREATING APPARATUS
Filed July 12, 1965

INVENTOR.
JOSEPH A. TOMCHAK
BY
ATTORNEY

United States Patent Office 3,319,687
Patented May 16, 1967

3,319,687
ACCESSORY FOR TIRE-TREATING APPARATUS
Joseph A. Tomchak, 600 Broadway,
McKees Rocks, Pa. 15136
Filed July 12, 1965, Ser. No. 471,306
5 Claims. (Cl. 150—54)

This invention relates generally to water sealing apparatus of the cover plate variety, and more particularly to the provision of means for preventing the flow of water or other liquids into an unmounted motor vehicle tire while the tire is being cleaned in tire-treating apparatus similar to that shown in my U.S. Patent No. 3,121,437.

The primary object of this invention is to provide a means whereby a circular metal plate, with appropriate devices fastened thereto, may be utilized as a water sealing apparatus which may be quickly attached to an unmounted motor vehicle tire prior to inserting the tire into the tire-treating apparatus. The water sealing apparatus thus functions as an effective sealing means while the motor vehicle tire is being cleaned in the tire-treating apparatus. After the tire has been cleaned and removed from the tire-treating apparatus, the metal plate may be quickly and easily removed from the tire.

The above object is accomplished by means of a handle fastened to the outside of the cover plate with a hook and two latching devices, fastened to the inside of the cover plate, the hook and latching devices effecting the water seal between the cover plate and the bead or edge of the circular opening in the motor vehicle tire.

Another object of this invention is to provide a means whereby the cover plate may be utilized for displaying advertising media of the self-adhering type commonly available. When the cover plate, with advertising media attached, is fastened to the tire and the two are displayed in outside weather conditions, such as is commonly done in automotive service stations, the cover plate serves also to prevent water and other elements present in the atmosphere from entering the tire casing.

These and other objects of the invention will, in part, be obvious and will, in part, appear hereinafter.

For a more complete understanding of the nature, objects and spirit of the invention, reference should be had to the following detailed description, taken in connection with the accompanying drawings, in which.

Figure 1:
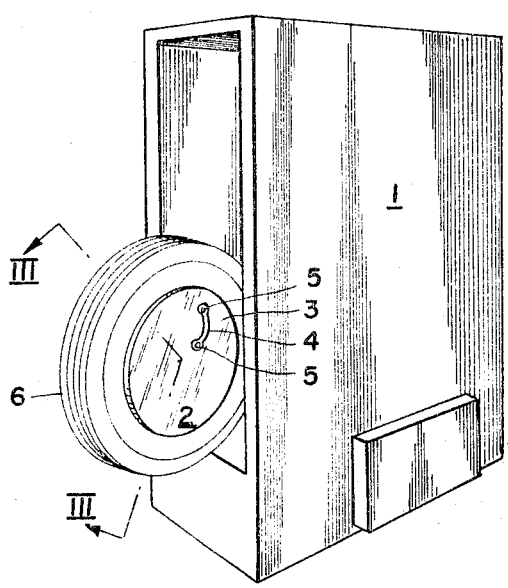
FIGURE 1 is a perspective pictorial representation of the water sealing apparatus of the invention mounted on a motor vehicle tire, prior to entering tire-treating apparatus.

Referring now in detail to FIG. 1, the invention is particularly adapted for use with tire-treating apparatus indicated at 1 and explained in detail in my U.S. Patent No. 3,121,437. By reference to the aforesaid patent, it will be seen that the tire-treating apparatus 1 comprises the outer casing shown in FIG. 1 and having a pair of laterally-spaced shafts extending therethrough. A pair of tire-supporting rollers are carried by each shaft such that upon rotation of the shafts, the tire will rotate thereon. A spraying pipe of generally U-shaped configuration is positioned to straddle a tire on the roller, the spraying pipe having jet openings directed toward the sides and tread of the tire. By continuously supplying fluid under pressure through the jets, and by rotating the tire on the aforesaid tire-supporting rollers, it will be appreciated that the sprays of water from the jets clean the entire outer surface of the tire.

When cleaning unmounted motor vehicle tires in apparatus such as that shown in Patent No. 3,121,437, it was found that a considerable amount of water and other foreign material such as dirt may accumulate in the tire casing during the cleaning cycle. In order to alleviate this problem, the water sealing device 2 of the present invention was devised and consists of a circular metal plate 3 of sufficient structural thickness with a handle 4 attached thereto by rivets 5 or other suitable means. This device is then fastened to the outside of a motor vehicle tire 6 by means hereinafter described, prior to inserting the motor vehicle tire 6 into the tire-treating apparatus 1 for a cleaning operation. An identical water sealing device 2 is also mounted on the opposite side of the tire, not shown in FIG. 1, but illustrated in FIG. 3.

As a result of the above, water or other liquids used in the tire-treating apparatus 1 is prevented from entering the inside of the tire 6 during the cleaning cycle by virtue of the two water sealing devices 2 covering the circular openings in opposite sides of the tire.

Figure 2:
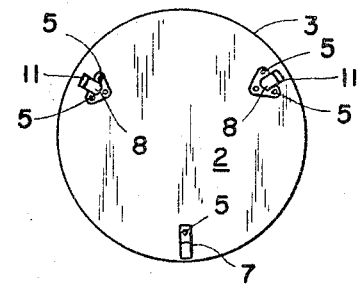
FIG. 2 is an elevational view of the inner face of the water sealing apparatus.
Figure 3:
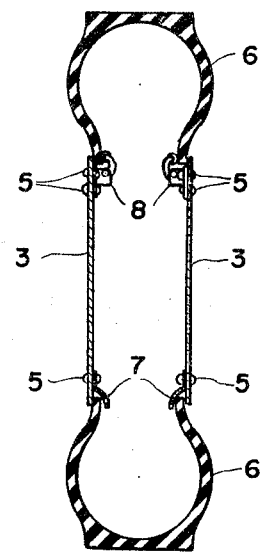
FIG. 3 is a vertical sectional view of two water sealing devices of the invention mounted on a motor vehicle tire, taken along the line III—III of FIG. 1.

Referring now in detail to FIGS. 2 and 3 which show the inner surface of the device 2, a hook or metal bracket 7 bent to an appropriate shape is securely fastened to the bottom of the circular metal plate 3 by a rivet 5 or other suitable means. Also rigidly fastened to the circular metal plate 3 by similar rivets 5 are two latching devices 8 of the type generally available commercially and commonly referred to as screen or storm door catches. These latching devices 8 are mounted 120° apart with respect to each other and 120° apart with respect to the hook 7.

As the hook 7 is engaged onto the bead or edge of the opening in the motor vehicle tire 6, it serves as the pivot means by which the water sealing device 2 is pivoted into place for fastening onto the motor vehicle tire 6. The latching devices 8 then securely fasten the water sealing device 2 to the motor vehicle tire 6 as hereinafter described, thereby effecting an equal distance three-point fastening means.

Figure 4:
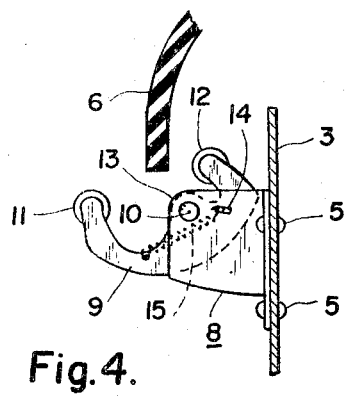
FIG. 4 is an enlarged vertical view of the latching device of the sealing apparatus of the invention prior to effecting the water seal as described hereinafter.
Figure 5:
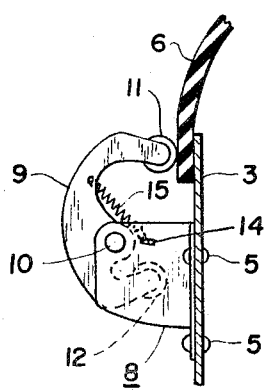
FIG. 5 is an enlarged vertical view of the latching device after effecting the water seal, as shown in FIG. 3.

As best shown in FIGS. 4 and 5, each latching device 8 comprises a generally C-shaped arm pivotal about an axis 10 extending parallel to plate 3 and having rollers 11 and 12 at its opposite ends. The arm 9 rotates about axis 10 between parallel plates, only one of said plates 13 being shown in FIGS. 4 and 5. Also extending between the aforesaid plates is a crossbar 14, and between the bar 14 and the left end of arm 9 (FIG. 4), a coil spring 15. With the arrangement shown, the spring 15 will cause the arm 9 to assume one of its two stable states shown in FIGS. 4 and 5. That is, the arm 9 will remain in the position shown in FIG. 4 until the roller 12 is forced to the right to a position where the spring 15 causes it to snap into the position shown in FIG. 5. Likewise, arm 9 will remain in the position of FIG. 5 until roller 11 is forced to the left to a position where the spring 15 causes it to snap back into the position of FIG. 4.

The method for effecting the water seal by the latching devices 8 is best illustrated by FIG. 4 taken in conjunction with FIG. 5. Prior to fastening the water sealing apparatus 2 to the motor vehicle tire 6, the arms 9 are in the position shown in FIG. 4. As the water sealing device 2 is brought into position by moving it from right to left, as viewed in FIG. 4, the rubber roller 12 at the right end of arm 9 makes contact with the bead or edge of the motor vehicle tire 6. As the water sealing device 2 is moved into the final position shown in FIG. 5, the matching rubber roller 11 exerts a force on the inner surface of the motor vehicle tire 6 at the periphery of the opening therein by virtue of the spring 15, causing the plate 3 to come into snug abutting relationship with respect to the periphery of the aforesaid opening in tire 6.

From the foregoing, it becomes apparent that an effective fastening and water seal is maintained at the bead of the motor vehicle tire 6 by means of the two latching devices 8.

After the cleaning of the motor vehicle tire 6 is completed, it is removed from the tire-treating apparatus 1; and the water sealing devices 2 are disconnected from the motor vehicle tire 6 by exerting a backward force on the respective handles 4. This force, in turn, acts to release the rubber roller 11 from the fastening position shown in FIG. 5 to the release position shown in FIG. 4. From this it becomes apparent that the water sealing device 2 may be quickly and easily removed from the motor vehicle tire 6.

The exterior surface of the circular metal plate 3 is an excellent surface for affixing and displaying advertising material, such as the self-adhering type commonly available. In this latter case, the handle 4 normally will be removed. The tire may be placed in a prominent manner as is commonly done in automotive service stations, for advertising purposes with the plate 3 containing the advertising media attached. In this manner, the apparatus serves a twofold purpose: to advertise the product displayed on the advertising media affixed to plate 3 and/or to prevent moisture and other elemtns present in the outside atmosphere from entering the unmounted motor vehicle tire 6, assuming the said tire is being displayed for advertising purposes outside.

In summary, therefore, an apparatus for preventing the flow of water or other objects into an unmounted motor vehicle tire while the said tire is being cleaned in a tire-treating apparatus, or is standing in the outside atmosphere, has been described. The water sealing apparatus also serves as an effective means of utilizing the outer surfaces thereof for advertising purposes.

Although the invention has been described in connection with a certain specific embodiment, it will be readily apparent to those skilled in the art that various changes in form and arrangement of parts may be made to suit requirements without departing from the spirit and scope of the invention.

I claim as my invention:

1. Apparatus for sealing the circular opening in an automotive tire against the admission of liquids and other matter into the interior of the tire, comprising a circular flat plate having a diameter slightly larger than the circular opening in said tire, a hook device secured to one side of said plate at the periphery thereof and adapted to fit over the edge of said circular opening and engage the inner periphery of the opening, and a plurality of latching devices circumferentially spaced from said hook device around the periphery of the plate, each of said latching devices including a generally C-shaped arm having a first position which permits the circular plate to fit over and cover the opening in the tire and a second position wherein it engages the inner wall of the tire at the periphery of said opening for holding the circular plate in snug abutting relationship with the periphery of the opening.

2. The apparatus of claim 1 and including a handle on the outer surface of said plate displaced substantially 180° from said hook device.

3. Apparatus for sealing the circular opening in an automotive tire against the admission of liquids and other matter into the interior of the tire, comprising a circular flat plate having a diameter slightly larger than the circular opening in said tire, a hook device secured to one side of said plate at the periphery thereof and adapted to fit over the edge of said circular opening and engage the inner periphery of the opening, and a plurality of latching devices circumferentially spaced from said hook device around the periphery of the plate, each of said latching devices comprising generally C-shaped arm means pivotal about an axis extending parallel to the surface of the plate, the arm being rotatable from a first position where its one end engages the outer periphery of the opening in the tire to a second position where its other end engages the inner periphery of the opening in the tire, and spring means for urging said arm to snap into its second position after it has been rotated a predetermined distance about said axis from its first position, said spring means also serving to cause said arm to snap back into it first position after it has been rotated a predetermined distance about said axis from its second position.

4. The apparatus of claim 3 wherein the latching devices are two in number, spaced 120° from each other about the periphery of the circular flat plate and each spaced 120° from said hook device.

5. Apparatus for preventing the inflow of liquids and other matter into a motor vehicle tire while the tire is being cleaned comprising a circular plate, a hook secured to one side of said plate and arranged to engage the periphery of the opening in the tire, a plurality of latching devices also secured to said one side of the plate and spaced from said hook device, each of said latching devices being adapted to releasably engage the inner periphery of the opening in the tire when the circular plate is pressed against the side of the tire after said hook device is positioned over the periphery of said opening, and a handle rigidly secured to the opposite side of said plate.

References Cited by the Examiner

UNITED STATES PATENTS

| | | | |
|---|---|---|---|
| 2,726,634 | 12/1955 | Horner | 150—54 X |
| 3,192,896 | 7/1965 | Irving | 118—505 |

FRANKLIN T. GARRETT, *Primary Examiner.*